United States Patent
Bodas (10) Patent No.: US 7,761,874 B2
(45) Date of Patent: Jul. 20, 2010

(54) MANAGING PROCESSING SYSTEM POWER AND PERFORMANCE BASED ON UTILIZATION TRENDS

(75) Inventor: Devadatta V. Bodas, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 1741 days.

(21) Appl. No.: 10/917,926

(22) Filed: Aug. 13, 2004

(65) Prior Publication Data

US 2006/0037024 A1 Feb. 16, 2006

(51) Int. Cl.
G06F 9/46 (2006.01)
G06F 1/00 (2006.01)

(52) U.S. Cl. .................. 718/100; 718/104; 713/300

(58) Field of Classification Search .................. 718/100, 718/101, 102, 104, 105, 103; 713/300
See application file for complete search history.

(56) References Cited

U.S. PATENT DOCUMENTS

| | | | | |
|---|---|---|---|---|
| 4,325,120 A * | 4/1982 | Colley et al. ................. | 711/202 |
| 4,924,428 A * | 5/1990 | Vea ................. | 714/1 |
| 5,696,701 A * | 12/1997 | Burgess et al. ................. | 714/25 |
| 5,953,536 A * | 9/1999 | Nowlin, Jr. ................. | 713/323 |
| 6,006,336 A * | 12/1999 | Watts et al. ................. | 713/322 |
| 6,009,452 A * | 12/1999 | Horvitz ................. | 718/102 |
| 6,081,868 A * | 6/2000 | Brooks ................. | 711/3 |
| 6,212,644 B1 * | 4/2001 | Shimoda et al. ................. | 713/324 |
| 6,216,235 B1 * | 4/2001 | Thomas et al. ................. | 713/501 |
| 6,272,642 B2 * | 8/2001 | Pole et al. ................. | 713/300 |
| 6,470,456 B1 * | 10/2002 | Chung-Chih ................. | 713/322 |
| 6,487,578 B2 * | 11/2002 | Ranganathan ................. | 718/104 |
| 6,487,668 B2 * | 11/2002 | Thomas et al. ................. | 713/322 |
| 6,795,781 B2 | 9/2004 | Aldridge et al. | |
| 6,801,994 B2 * | 10/2004 | Beckert et al. ................. | 711/207 |
| 6,829,713 B2 * | 12/2004 | Cooper et al. ................. | 713/320 |
| 6,988,156 B2 * | 1/2006 | Musumeci ................. | 710/260 |
| 7,007,180 B2 * | 2/2006 | Hashimoto ................. | 713/320 |
| 7,035,927 B2 * | 4/2006 | Flockhart et al. ................. | 709/225 |
| 7,107,339 B1 * | 9/2006 | Wolters ................. | 709/224 |
| 7,131,016 B2 * | 10/2006 | Oh et al. ................. | 713/322 |
| 7,194,385 B2 * | 3/2007 | Flautner et al. ................. | 702/186 |
| 7,203,737 B2 * | 4/2007 | Starbuck et al. ................. | 709/219 |
| 7,302,685 B2 * | 11/2007 | Binns et al. ................. | 718/103 |
| 7,366,685 B2 * | 4/2008 | Emerick et al. ................. | 705/26 |
| 7,426,731 B2 * | 9/2008 | Findeisen, Piotr ................. | 718/104 |
| 7,461,376 B2 * | 12/2008 | Geye et al. ................. | 718/100 |

(Continued)

OTHER PUBLICATIONS

Mun et al. ("dDVS: An efficient dynamic voltage scalling algorithm based on the differential of CPU utilization", Springer, Aug. 19, 2004, pp. 160-169).*

(Continued)

*Primary Examiner*—Thomas Lee
*Assistant Examiner*—Caroline Arcos
(74) *Attorney, Agent, or Firm*—Kacvinsky LLC (57) ABSTRACT

Systems and methods of managing processing system performance provide for determining a utilization of a processing system over a time quantum. A trend in the utilization of the processing system is also determined, where the trend can be used to select a performance state for the processing system. In one embodiment, the processing system includes a central processing unit (CPU).

33 Claims, 6 Drawing Sheets

U.S. PATENT DOCUMENTS

| | | | |
|---|---|---|---|
| 2002/0073400 A1* | 6/2002 | Beuten et al. | 717/127 |
| 2002/0087897 A1* | 7/2002 | Cline et al. | 713/300 |
| 2002/0103705 A1* | 8/2002 | Brady | 705/14 |
| 2002/0147759 A1* | 10/2002 | Ranganathan | 709/104 |
| 2002/0194509 A1* | 12/2002 | Plante et al. | 713/300 |
| 2003/0006988 A1* | 1/2003 | Alford et al. | 345/440 |
| 2003/0152070 A1* | 8/2003 | Fuchs | 370/373 |
| 2003/0187612 A1* | 10/2003 | Miyake | 702/176 |
| 2003/0200369 A1* | 10/2003 | Musumeci | 710/260 |
| 2003/0200473 A1* | 10/2003 | Fung | 713/320 |
| 2004/0003303 A1* | 1/2004 | Oehler et al. | 713/300 |
| 2004/0039954 A1* | 2/2004 | White et al. | 713/322 |
| 2004/0059956 A1* | 3/2004 | Chakravarthy et al. | 713/600 |
| 2004/0083341 A1* | 4/2004 | Robinson et al. | 711/133 |
| 2004/0123297 A1* | 6/2004 | Flautner et al. | 718/102 |
| 2004/0139138 A1 | 7/2004 | Chen et al. | |
| 2004/0139302 A1* | 7/2004 | Flautner et al. | 712/220 |
| 2005/0097228 A1* | 5/2005 | Flautner et al. | 710/1 |
| 2005/0108587 A1* | 5/2005 | Cooper et al. | 713/320 |
| 2005/0108714 A1* | 5/2005 | Geye et al. | 718/100 |
| 2005/0108717 A1* | 5/2005 | Hong et al. | 718/102 |
| 2005/0138438 A1* | 6/2005 | Bodas | 713/300 |
| 2005/0138442 A1* | 6/2005 | Keller et al. | 713/300 |
| 2006/0090161 A1 | 4/2006 | Bodas et al. | |
| 2008/0027841 A1* | 1/2008 | Eder | 705/35 |

OTHER PUBLICATIONS

U.S. Appl. No. 10/982,613; Title: Power Consumpton-Based Thread Scheduling; Inventor: Devadatta V. Bodas et al.; filed Nov. 03, 2004.

U.S. Appl. No. 11/003,561; Title: Performance State-Based Thread Management; Inventor: Jun Nakajima et al.; filed Dec. 02, 2004.

U.S. Appl. No. 11/393,393; Title: Performance State Management; Inventor: Devadatta V. Bodas; filed Mar. 30, 2006.

* cited by examiner

MANAGING PROCESSING SYSTEM POWER AND PERFORMANCE BASED ON UTILIZATION TRENDS

BACKGROUND

1. Technical Field

One or more embodiments of the present invention generally relate to power and performance management. In particular, certain embodiments relate to managing processing system power and performance based on utilization trends.

2. Discussion

As the use of the Internet permeates throughout society and individuals become increasingly mobile, computing systems such as servers, desktop personal computers (PCs), notebook PCs, personal digital assistants (PDAs) and wireless "smart" phones continue to grow in popularity. The demand for increased functionality has resulted in the central processing units (CPUs) of these systems becoming more and more advanced, with the number of transistors continually on the rise (and transistor gate size on the decline). Processing speeds have also reached new heights. These advances, however, have presented computing system designers and well as manufacturers with a number of challenges.

A particular challenge relates to the tradeoff between performance and power consumption. For example, while the desirability of high-speed CPUs is apparent from a performance standpoint, high frequencies generally translate into greater power consumption. Similarly, smaller transistors have been linked to greater leakage current. To deal with this phenomenon, a number of conventional approaches selectively place the CPU in various performance states, where higher performance states provide relatively high performance and high power consumption, and lower performance states provide relatively low performance and low power consumption. An example of such a technique involves scaling the clock frequency of a CPU based on performance and/or power requirements.

Traditional approaches to selecting performance states identify the appropriate setting based on the utilization of the CPU. For example, it is common to define a time quantum, where utilization is calculated from the aggregate time the CPU spends in "idle" task during the time quantum. For a given CPU, an operating system (OS) schedules tasks for the CPU to execute and when there is no task to execute the CPU executes a default task called an idle task. Idle tasks also include time spent in lower power CPU states such as halt (C1/C1E), stop-grant (C2), sleep (C3) and deep sleep (C4) as described in the Advanced Configuration and Power Interface Specification (e.g., Draft ACPI Specification, Rev. x285, June, 2004).

Unfortunately, traditional approaches fail to take into consideration utilization trends that occur within a given time quantum. Thus, if the utilization of the CPU primarily occurs near the end of the time quantum, the selected performance state may fail to satisfy a demand for the CPU that is increasing. The result could be a significant degradation in performance. Similarly, if the utilization of the CPU primarily occurs near the beginning of the time quantum, the selected performance state may fail to account for a decreasing demand for the CPU. The result could be excessive power consumption in the CPU. Simply put, conventional approaches apply an equal weight to utilization/idleness periods, regardless of when they occur within the time quantum, and may therefore provide less than optimal results.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
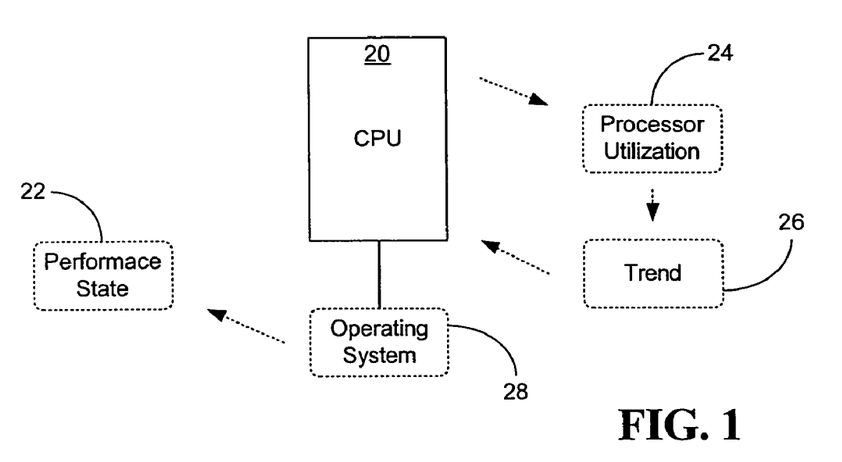
FIG. 1 is a block diagram of an example of a CPU according to one embodiment of the invention.

FIG. 1 shows a central processing unit (CPU) 20 having an operating system (OS) that selects a performance state 22 based on a utilization 24 of the CPU 20 and a trend 26 in the utilization 24 of the CPU 20, where the CPU 20 has logic to determine the utilization 24 and the trend 26. The performance state 22 can be a performance state as referred to in the Advanced Configuration and Power Interface (ACPI) specification. The illustrated CPU 20 could be similar to the Pentium® 4 processor from Intel® Corporation, in Santa Clara, Calif., and is fully functional with instruction fetch units, instruction decoders, level one (L1) cache, execution units, and so on. The CPU 20 may represent a single core of a multi-core processor or a stand-alone CPU. The OS 28 schedules tasks for the CPU 20 to execute, and can also operate in conjunction with the CPU 20 in the selection of the performance state 22. It should be noted that although the illustrated operating system 28 selects the performance state 22 for the CPU 20, the performance state 22 could also be selected by software running on another core in a multi-core architecture or another CPU in a multi-processor architecture. The performance state 22 may also be selected by hardware logic external to the CPU 20, basic input/output system (BIOS) routines, firmware or application software.

Although the illustrated example shows a CPU 20 benefiting from the use of trend 26 information, it should be noted that the embodiments of the invention are not so limited. Indeed, any processing system component for which power consumption is an issue of concern can benefit from the concepts described herein. For example, input/output (I/O) controllers, memory controllers, graphics controllers, additional CPUs and a processing system including any combination thereof, can be readily substituted for the CPU 20. Notwithstanding, there a number of aspects of CPUs for which the embodiments of the invention are well suited.

As already noted, the performance state 22 could represent a frequency and/or core voltage setting for the CPU 20, where the performance state 22 defines a particular performance level for the CPU 20. Generally, higher frequencies and core voltages enable greater performance for the CPU 20. By selecting the performance state 22 based on the trend 26, the CPU 20 is able to deal more proactively with changes in the CPU utilization 24. For example, if the trend 26 in the utilization 24 is increasing, the performance state 22 can also be increased to satisfy a demand for the CPU 20 that is greater than would normally be expected for the utilization 24. Similarly, if the trend 26 in the utilization 24 is decreasing, the performance state 22 can be decreased to account for a demand for the CPU 20 that is lesser than would normally be expected for the utilization 24.

Figure 2:
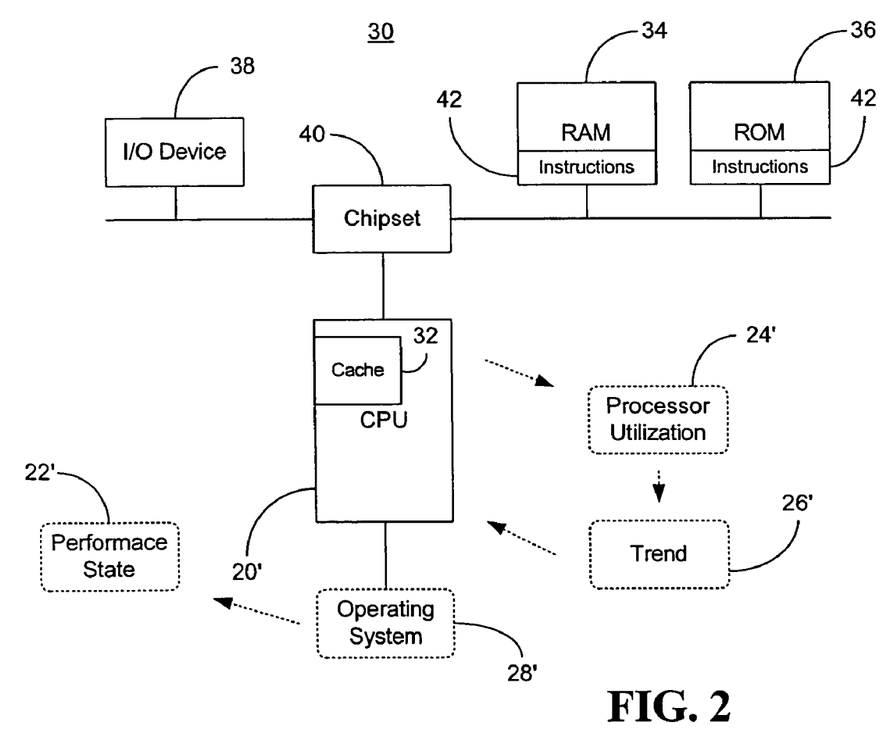
FIG. 2 is a block diagram of an example of a system according to one embodiment of the invention.

Turning now to FIG. 2, a system 30 is shown in which a CPU 20' has a cache 32, as well as other fetch units, decoders, etc., and is coupled to a random access memory (RAM) 34, a read only memory (ROM) 36 and one or more input/output (I/O) devices 38 by way of a chipset 40. The illustrated RAM 34 and ROM 36 store instructions 42 that are related to tasks scheduled by the OS 28' and executed by the CPU 20', where a performance state 22' is selected based on a utilization 24' of the CPU 20' and a trend 26' in the utilization 24'. A similar approach could be taken for an I/O controller and/or a memory controller (not shown) of the chipset 40. As already noted, use of the trend 26' information provides for a greater performance and power savings.

Figure 3:
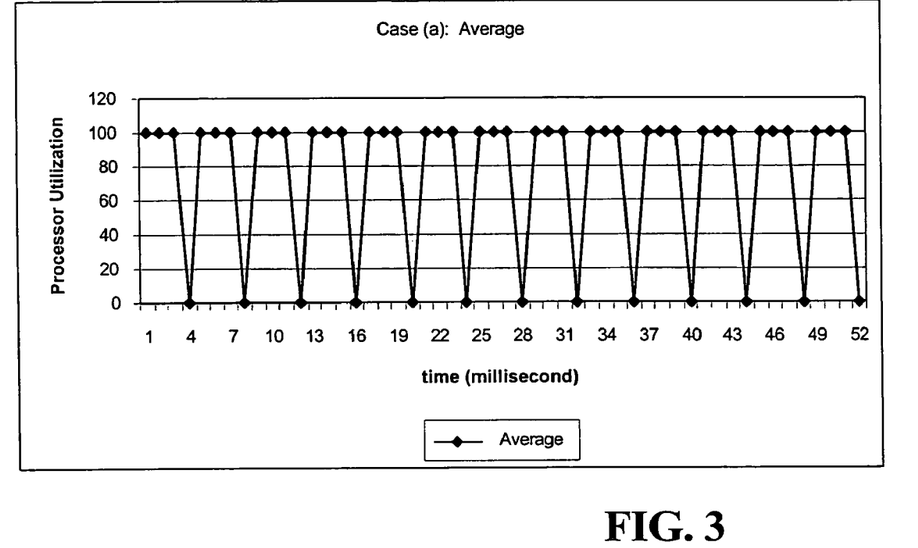
FIG. 3 is a plot of an example of a balanced CPU workload according to one embodiment of the invention.

FIG. 3 shows a plot 44 of a workload of a processing system such as a CPU, I/O controller, memory controller, or any combination thereof, where each point in the plot 44 indicates whether an idle task has been scheduled for the processing system. In the illustrated example, every fourth time slot is associated with an idle task and the workload of the processing system is relatively balanced over the time quantum in question. The time quantum is essentially the data collection window used for making performance state determinations. Thus, in the illustrated example, the time quantum is fifty-two milliseconds. It should be noted, however, that this value is used to facilitate discussion only, and that other values may be used for the time quantum without parting from the spirit and scope of the embodiments described herein. Since every fourth time slot is associated with an idle task, the processing system utilization obtained from the plot 44 is seventy-five percent. Although the illustrated embodiment describes a balanced workload for a utilization of seventy-five percent, the concept is applicable to any utilization level (e.g., one to ninety-nine percent). The same is true for all workload plots described herein.

Figure 4:
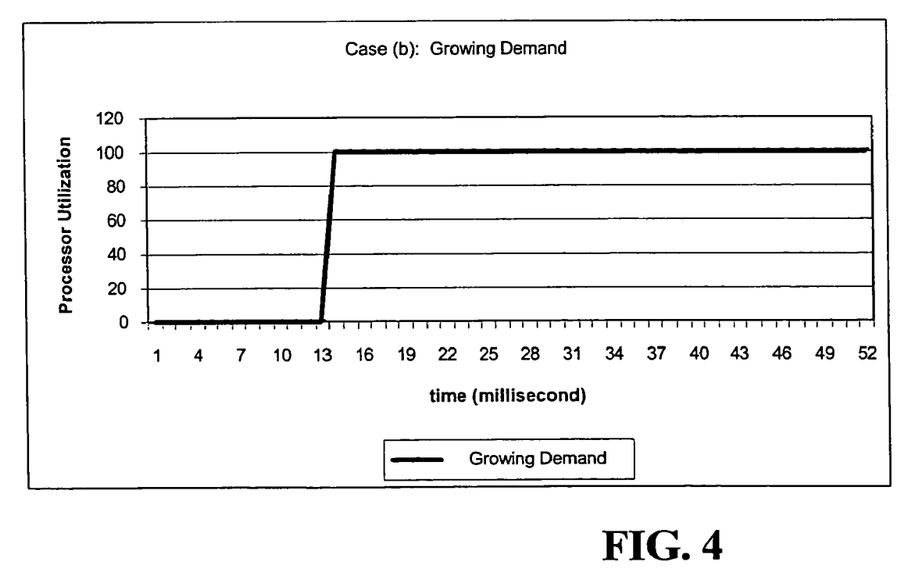
FIG. 4 is a plot of an example of an increasing CPU workload according to one embodiment of the invention.

FIG. 4 shows a utilization plot 46 in which the workload of the processing system is increasing. In particular, in the illustrated example, the idle tasks primarily occur near the beginning of the time quantum, where the processing system is busy for the remainder of the time quantum. The average utilization over the time quantum, however, is still seventy five percent. Conventional approaches would therefore result in the selection of the same performance state for the workload of plot 46 as for the workload of plot 44 (FIG. 3). processing system starvation could therefore occur under these approaches. The embodiments described herein, however, are able to take the increasing trend into consideration when selecting the performance state, and may therefore select a higher performance state to satisfy the increasing demand. Simply put, under the illustrated embodiments, the same average processing system utilization can result in different performance states because trend data is used.

Figure 5:
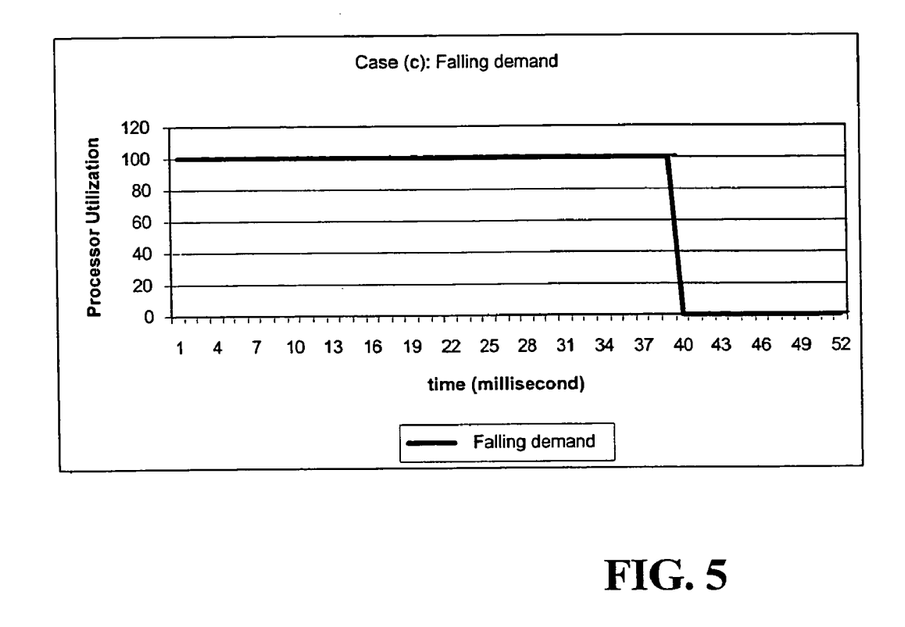
FIG. 5 is a plot of an example of a decreasing CPU workload according to one embodiment of the invention.

FIG. 5 shows a utilization plot 48 in which the workload of the CPU is decreasing. In particular, in the illustrated example, the idle tasks primarily occur near the end of the time quantum, where the processing system is busy at the beginning of the time quantum. The average utilization over the time quantum, once again, is seventy-five percent. Accordingly, conventional approaches would select the same performance state for the workload of plot 48 as for the workload of plot 44 (FIG. 3), potentially resulting in excessive power consumption. The embodiments described herein, however, are able to take the decreasing trend into consideration when selecting the performance state, and may therefore select a lower performance state to conserve power. As already noted, the use of trend data provides for more effective performance state management.

The following table shows an example of how performance states can be selected for a CPU. The traditional approach to using the table would be to select the P0 state (i.e., operate at 3.0 GHz) when the CPU utilization is over 86%, select the P1 state (i.e., operate at 2.6 GHz) when the CPU utilization is between 80% and 85%, and so on. Thus, the following table demonstrates that in a system that is limited to utilization data, the performance state would be selected to be P2 in the above example of seventy-five percent utilization. In the embodiments described herein, however, a workload such as plot 46 (FIG. 4) could result in the selection of the P1 performance state for the CPU and a workload such as plot 48 could result in the selection of the P3 performance state for the CPU.

TABLE I

| State | Frequency | Power | Utilization |
| --- | --- | --- | --- |
| P0 | 3.0 GHz | 90 W | >86% |
| P1 | 2.6 GHz | 75 W | 80-85 |
| P2 | 2.4 GHz | 55 W | 67-79 |
| P3 | 2.0 GHz | 40 W | <67 |

Figure 6:
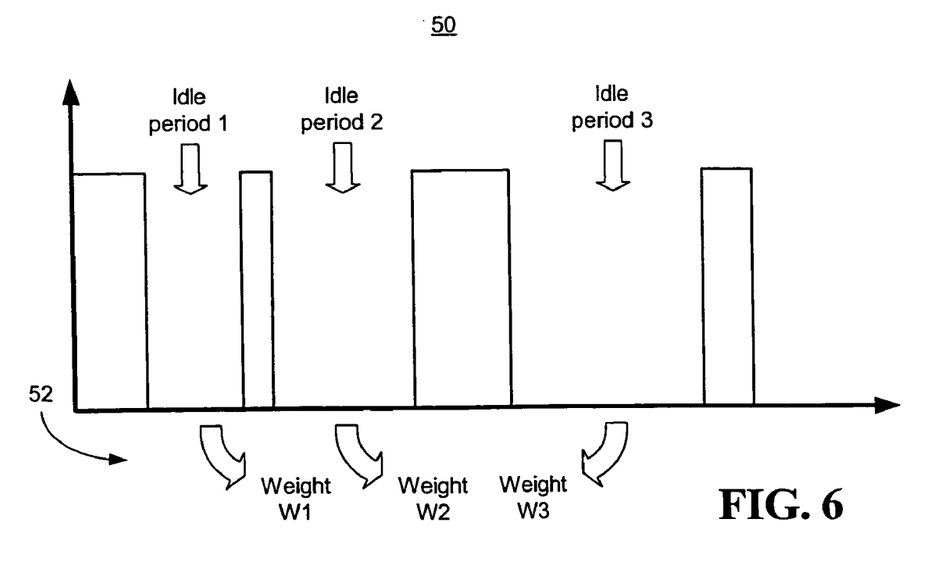
FIG. 6 is a plot of an example of a weighting policy according to one embodiment of the invention.

FIG. 6 shows a processing system utilization plot 50 and an example of a weighting policy 52 that can be used to quantify the utilization trend. In particular, the illustrated plot 50 includes three idle periods (i.e., idle period 1, idle period 2, idle period 3), during which idle tasks are scheduled for a processing system. The first idle period occurs near the beginning of the time quantum, and therefore the idle tasks associated with this period are assigned a first weight, W1. Similarly, the second idle period occurs near the middle of the time quantum, and the idle tasks associated with this period are assigned a second weight, W2. Likewise, idle tasks associated with the third idle period are assigned a third weight, W3. Simply put, the weighting policy 52 assigns different weights to idle tasks occurring near the beginning, middle and end of the time quantum. Other weighting policies can be readily used without parting from the spirit and scope of the embodiments described herein.

Figure 7:
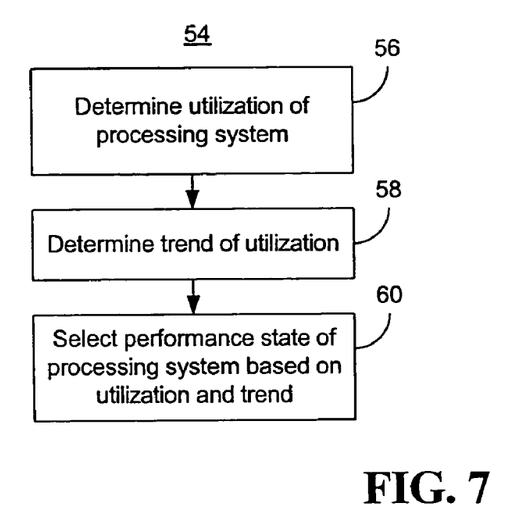
FIG. 7 is a flowchart of an example of a method of managing CPU performance and/or power according to one embodiment of the invention.

FIG. 7 shows a method 54 of managing a processing system according to one embodiment of the invention. The illustrated method 54 can be implemented using any available hardware and/or software programming technique. For example, the method 54 could be incorporated into a reduced instruction set computer (RISC) processor as fixed functionality hardware, or stored in a machine readable medium as a set of instructions capable of being executed by a processor. In particular, processing block 56 provides for determining a utilization of a processing system over a time quantum and block 58 provides for determining a trend in the utilization of the processing system over the time quantum. A performance state is selected for the processing system at block 60 based on the utilization and the trend in the utilization. In one embodiment, blocks 56 and 58 are implemented in complementary metal oxide semiconductor (CMOS) hardware and block 60 is implemented in OS software.

Figure 8:
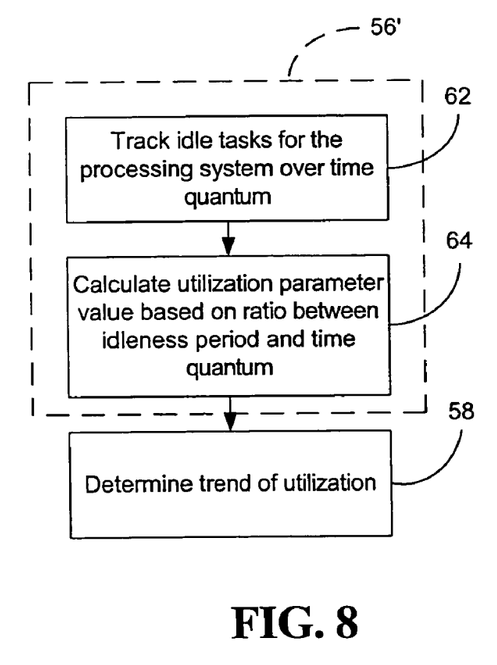
FIG. 8 is a flowchart of an example of a process of determining a utilization of a CPU according to one embodiment of the invention.

FIG. 8 shows one approach to determining the processing system utilization in greater detail at block 56'. In the illustrated example, idle tasks for the processing system are tracked over the time quantum at block 62. Block 64 provides for calculating a utilization parameter value based on a ratio between an idleness period and the time quantum, where the idleness period corresponds to the idle tasks occurring during the time quantum. For example, if the processing system was scheduled to run an idle task once every four time slots, the utilization parameter value would be seventy-five percent.

Figure 9:
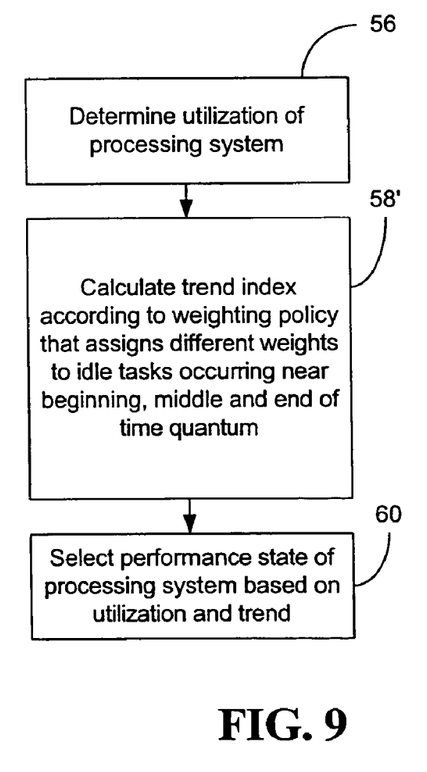
FIG. 9 is a flowchart of an example of a process of determining a CPU utilization trend according to one embodiment of the invention.

Turning now to FIG. 9, one approach to determining the trend in the utilization is shown in greater detail at block 58'. In particular, the illustrated block 58' provides for calculating a trend index according to a weighting policy that assigns different weights to idle tasks occurring near the beginning, the middle and the end of the time quantum. The trend index can then be used to select a performance state for the processing system at block 60. As will be discussed in greater detail below, such a weighting policy can be achieved by summing the task times associated with idle tasks.

Figure 10A:
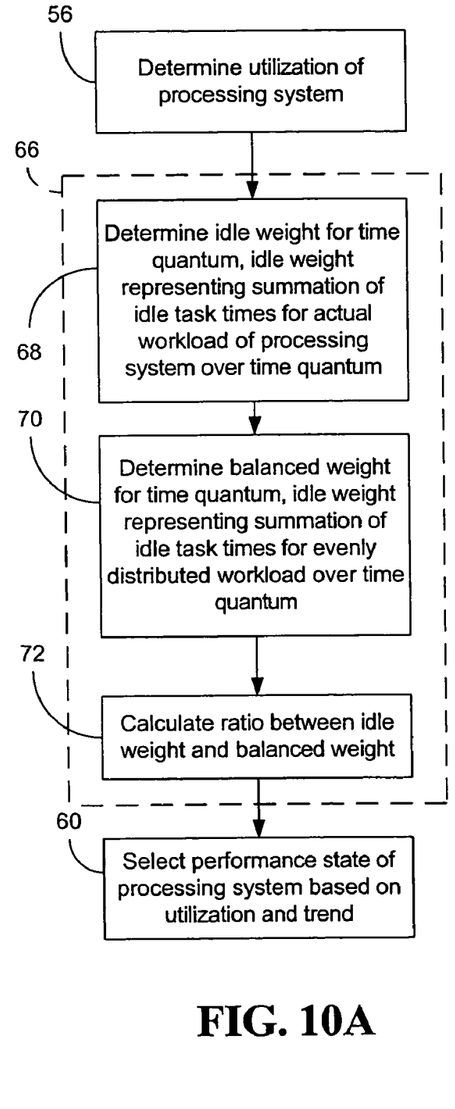
FIG. 10A is a flowchart of an example of a process of calculating a trend index according to one embodiment of the invention.

FIG. 10A shows one particular approach to calculating the trend index in greater detail at block 66. Thus, block 66 may be readily substituted for block 58' (FIG. 9) discussed above. In particular, block 68 provides for determining an idle weight for the time quantum, where the idle weight represents a summation of idle task times for an actual workload of the processing system over the time quantum. The term "task time" is used herein to refer to a particular time slot within the time quantum. For example, if the processing system is idle from the one millisecond time slot through the twelve millisecond time slot, the idle weight may be equal to, $$\sum_{n=1}^{12} n = 1 + 2 + 3 + \ldots 11 + 12 = 78. \qquad \text{Equation I}$$

This idle weight corresponds to the plot 46 (FIG. 4) of a workload having an increasing demand, discussed above. Similarly, the idle weight for the plot 48 (FIG. 5) of a workload having a decreasing demand, would be 585 because the summation would include the task times at the upper end of the time quantum. The idle weight for the plot 44 (FIG. 3) of the balanced workload would be 300. By dividing the idle weight by a balanced weight, which essentially represents a balanced load for the utilization in question, an index can be obtained where an index that is less than one indicates decreasing demand and an index that is greater than one indicates an increasing demand. Block 70 provides for determining a balanced weight, where the balanced weight represents a summation of idle task times for an evenly distributed workload at the given processing system utilization. Thus, for a processing system utilization of seventy-five percent, the balanced weight would be expected to be, $$25\% * \sum_{n=1}^{50} n = 0.25 * 1275 = 318.75. \qquad \text{Equation II}$$

Thus, by calculating the ratio between the idle weight and the balanced weight at block 72, a trend index can be obtained. In the above example, the trend index would be, $$\frac{78}{318.75} = 24.5\%. \qquad \text{Equation III}$$

Figure 10B:
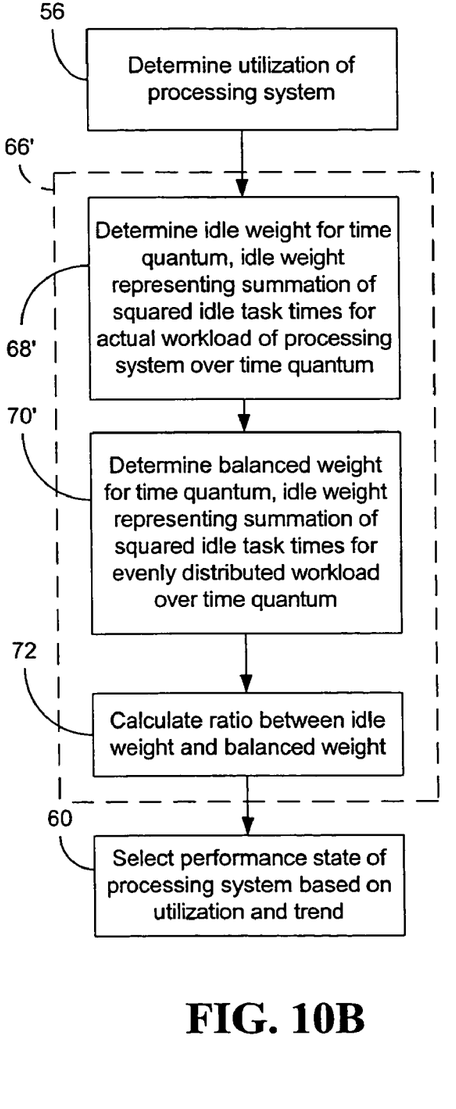
FIG. 10B is a flowchart of an example of a process of calculating a trend index according to an alternative embodiment of the invention.

FIG. 10B shows an alternative approach to calculating the trend index at block 66'. Thus, block 66' may be readily substituted for block 58' (FIG. 9) discussed above. In particular, block 68' provides for determining an idle weight for the time quantum, where the idle weight represents a squared summation of idle task times for an actual workload of the processing system over the time quantum. For example, if the processing system is idle from the one millisecond time slot through the twelve millisecond time slot, the idle weight may be equal to, $$\sum_{n=1}^{12} n^2 = 1^2 + 2^2 + 3^2 + \ldots 11^2 + 12^2 = 650. \qquad \text{Equation IV}$$

Once again, this idle weight corresponds to the plot 46 (FIG. 4) of a workload having an increasing demand, discussed above. Similarly, the idle weight for the plot 48 (FIG. 5) of a workload having a decreasing demand, would be 23,906 because the summation would include the task times at the upper end of the time quantum. The idle weight for the plot 44 (FIG. 3) of the balanced workload would be 12,389. Because the weight increases at a much greater rate, the squared summation approach provides enhanced sensitivity. Block 70' provides for determining a balanced weight, where the balanced weight represents a summation of idle task times for an evenly distributed workload at the given processing system utilization. Thus, for a processing system utilization of seventy-five percent, the balanced weight would be expected to be, $$25\% * \sum_{n=1}^{50} n^2 = 0.25 * 45526 = 11,381.5. \qquad \text{Equation V}$$

Thus, by calculating the ratio between the idle weight and the balanced weight at block 72, a trend index can be obtained. In the above example, the trend index would be, $$\frac{650}{11381.5} = 5.7\%. \qquad \text{Equation VI}$$

An example of a generic equation to calculate weight based on different policies can therefore be given by, $$\sum_{x=1}^{n} Ax \times Wx^{Bx}.$$ Equation VII Where fore the time slot x, Wx is the weight for the time slot, Ax is the weight multiplier and Bx is the rate to increase the weight for the logarithmic scale. Thus, for the first policy described above, Ax=1, Wx=x and Bx=1; for all x. For the second (alternative) policy described above, Ax=1, Wx=x and Bx=2; for all x.

Figure 11A:
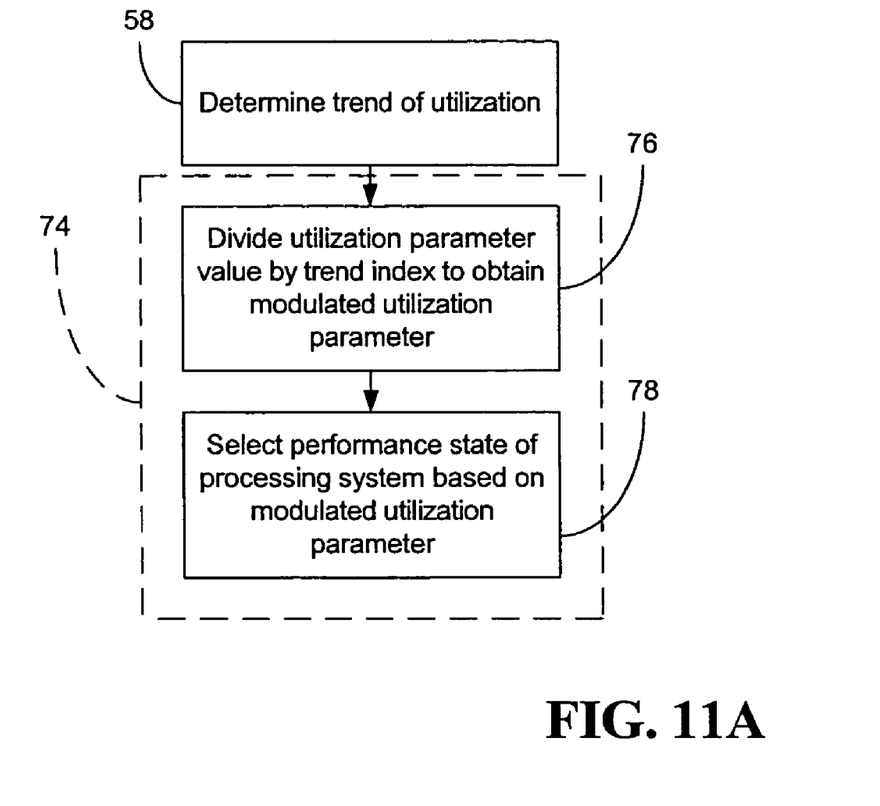
FIG. 11A is a flowchart of an example of a process of selecting a performance state for a CPU according to one embodiment of the invention.

Turning now to FIG. 11A, one approach to selecting the performance state is shown in greater detail at block 74. Thus, block 74 can be readily substituted for block 60 (FIG. 7) discussed above. In particular, block 76 provides for dividing a utilization parameter value by the trend index to obtain a modulated utilization parameter value. A performance state is selected at block 78 based on the modulated utilization parameter value. Thus, for a straight summation approach, the modulated utilization parameter values for the scenarios discussed above would be as follows.

TABLE II

| Case | Utilization | Modulated Utilization |
| --- | --- | --- |
| Balanced | 75% | 79.9% |
| Increasing | 75% | 306% |
| Decreasing | 75% | 54.5% |

Figure 11B:
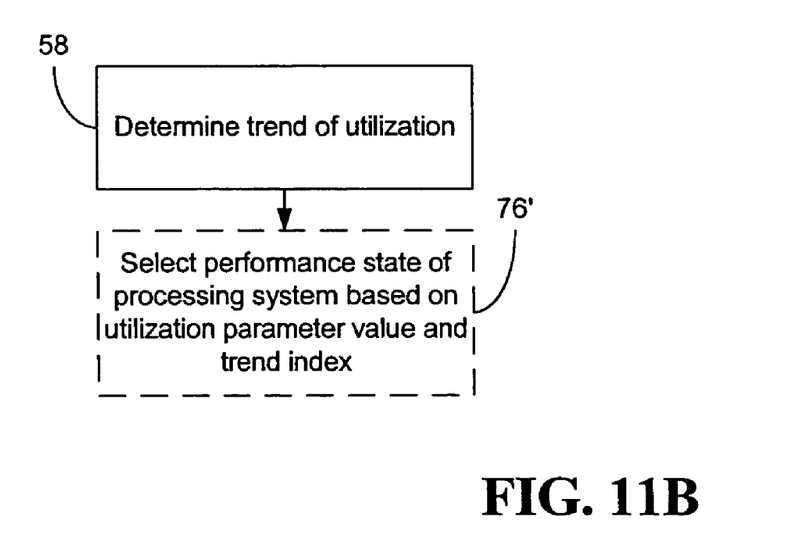
FIG. 11B is a flowchart of an example of a process of selecting a performance state for a CPU according to an alternative embodiment of the invention.

Such an approach would enable reuse of software elements that are limited to utilization data. FIG. 11B shows an alternative approach to selecting the performance state at block 76', which can be readily substituted for block 60 (FIG. 7) discussed above. In particular, block 76' provides for selecting the performance state based on the utilization parameter and the trend index.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A computer implemented method comprising:
    determining a utilization of a processing system over a time quantum;
    determining a trend in the utilization of the system over the time quantum; and
    selecting a performance state for the processing system based on the utilization of the processing system and the trend in the utilization;
    wherein determining the trend includes calculating a trend index according to a weighting policy that assigns different weights to idle tasks occurring at different times of the time quantum.

2. The method of claim 1, wherein determining the trend includes:
    tracking one or more idle tasks for the processing system over the time quantum; and
    calculating the trend index according to a weighting policy that assigns different weights to idle tasks occurring near a beginning, a middle and an end of the time quantum.

3. The method of claim 2, wherein calculating the trend index includes:
    determining an idle weight for the time quantum, the idle weight representing a summation of idle task times for an actual workload of the processing system over the time quantum;
    determining a balanced weight for the time quantum, the balanced weight representing a summation of idle task times for an evenly distributed workload over the time quantum; and
    calculating a ratio between the idle weight and the balanced weight.

4. The method of claim 2, wherein calculating the trend index includes:
    determining an idle weight for the time quantum, the idle weight representing a summation of squared idle task times for an actual workload of the processing system over the time quantum;
    determining a balanced weight for the time quantum, the balanced weight representing a summation of squared idle task times for an evenly distributed workload over the time quantum; and
    calculating a ratio between the idle weight and the balanced weight.

5. The method of claim 2, further including:
    determining the utilization by calculating a utilization parameter value based on a ratio between an idleness period and the time quantum, the idleness period corresponding to the idle tasks occurring during the time quantum.

6. The method of claim 5, further including dividing the utilization parameter value by the trend index to obtain a modulated utilization parameter value, the selecting including selecting the performance state based on the modulated utilization parameter value.

7. The method of claim 5, wherein the selecting includes selecting the performance state based on the utilization parameter value and the trend index.

8. The method of claim 5, wherein the performance state is selected based on the utilization of the processing system and an increasing demand for the utilization of the processing system.

9. The method of claim 5, wherein the performance state is selected based on the utilization of the processing system and a decreasing demand for the utilization of the processing system.

10. The method of claim 1, wherein determining the utilization and the trend of the processing system includes determining a utilization and a trend of one or more components selected from a group comprising a central processing unit, a memory controller and an input/output (I/O) controller.

11. An apparatus comprising:
    one or more processors having logic to determine a utilization of a processing system over a time quantum and to determine a trend in the utilization of the processing system over the time quantum, the one or more processors of the processing system to select a performance state based on the utilization of the processing system and the trend in the utilization, wherein determining the trend includes calculating a trend index according to a weighting policy that assigns different weights to idle tasks occurring at different times of the time quantum.

12. The apparatus of claim 11, wherein the logic is to track one or more idle tasks for the processing system over the time quantum and determine the trend by calculating the trend index according to a weighting policy that assigns different weights to idle tasks occurring near a beginning, a middle and an end of the time quantum.

13. The apparatus of claim 12, wherein the logic is to determine an idle weight for the time quantum, the idle weight to represent a summation of idle task times for an actual workload of the processing system over the time quantum, determine a balanced weight for the time quantum, the balanced weight to represent a summation of idle task times for an evenly distributed workload over the time quantum, and calculate a ratio between the idle weight and the balanced weight.

14. The apparatus of claim 12, wherein the logic is to determine an idle weight for the time quantum, the idle weight to represent a summation of squared idle task times for an actual workload of the processing system over the time quantum, determine a balanced weight for the time quantum, the balanced weight to represent a summation of squared idle task times for an evenly distributed workload over the time quantum, and calculate a ratio between the idle weight and the balanced weight.

15. The apparatus of claim 12, wherein the logic is to determine the utilization by calculating a utilization parameter value based on a ratio between an idleness period and the time quantum, the idleness period to correspond to the idle tasks occurring during the time quantum.

16. The apparatus of claim 15, wherein the logic is to divide the utilization parameter value by the trend index to obtain a modulated utilization parameter value, the performance state to be selected based on the modulated utilization parameter value.

17. The apparatus of claim 15, wherein the performance state is to be selected based on the utilization parameter value and the trend index.

18. The apparatus of claim 15, wherein the performance state is to be selected based on the utilization of the processing system and an increasing demand for the utilization of the processing system.

19. The apparatus of claim 15, wherein the performance state is to be selected based on the utilization of the processing system and a decreasing demand for the utilization of the processing system.

20. The apparatus of claim 11, wherein the processing system includes one or more components selected from a group comprising a central processing unit, a memory controller and an input/output (I/O) controller.

21. A system comprising:
a random access memory to store instructions; and
a processing system coupled to the random access memory to execute the instructions, the processing system having logic to select a performance state based on a utilization of the processing system and a trend in the utilization of the processing system, wherein the trend is determined by calculating a trend index according to a weighting policy that assigns different weights to idle tasks occurring at different times of the time quantum.

22. The system of claim 21, wherein the logic is to track one or more idle tasks for the processing system over a time quantum and determine the trend by calculating the trend index according to a weighting policy that assigns different weights to idle tasks occurring near a beginning, a middle and an end of the time quantum.

23. The system of claim 22, wherein the logic is to determine the utilization by calculating a utilization parameter based on a ratio between an idleness period and the time quantum, the idleness period to correspond to the idle tasks occurring during the time quantum.

24. The system of claim 23, wherein the logic is to divide the utilization parameter value by the trend index to obtain a modulated utilization parameter value, the performance state to be selected based on the modulated utilization parameter value.

25. The system of claim 23, wherein the performance state is to be selected based on the utilization parameter value and the trend index.

26. The system of claim 21, wherein the processing system includes one or more components selected from a group comprising a central processing unit, a memory controller and an input/output (I/O) controller.

27. A method comprising:
tracking one or more idle tasks for a central processing unit (CPU) over a time quantum;
determining a utilization of the CPU by calculating a utilization parameter value based on a ratio between an idleness period and the time quantum, the idleness period corresponding to the idle tasks occurring during the time quantum;
determining a trend in the utilization of the CPU by calculating a trend index according to a weighting policy that assigns different weights to idle tasks occurring near a beginning, a middle and an end of the time quantum; and
selecting a performance state for the CPU based on the utilization and the trend.

28. The method of claim 27, wherein calculating the trend index includes:
determining an idle weight for the time quantum, the idle weight representing a summation of idle task times for an actual workload of the CPU over the time quantum;
determining a balanced weight for the time quantum, the balanced weight representing a summation of idle task times for an evenly distributed workload over the time quantum; and
calculating a ratio between the idle weight and the balanced weight.

29. The method of claim 27, wherein calculating the trend index includes:
determining an idle weight for the time quantum, the idle weight representing a summation of squared idle task times for an actual workload of the CPU over the time quantum;
determining a balanced weight for the time quantum, the balanced weight representing a summation of squared idle task times for an evenly distributed workload over the time quantum; and
calculating a ratio between the idle weight and the balanced weight.

30. The method of claim 27, further including dividing the utilization parameter value by the trend index to obtain a modulated utilization parameter value, the selecting including selecting the performance state based on the modulated utilization parameter value.

31. The method of claim 27, wherein the selecting includes selecting the performance state based on the utilization parameter value and the trend index.

32. The method of claim 27, wherein the performance state is selected based on the utilization of the CPU and an increasing demand for the utilization of the CPU.

33. The method of claim 27, wherein the performance state is selected based on the utilization of the CPU and a decreasing demand for the utilization of the CPU.

* * * * *

UNITED STATES PATENT AND TRADEMARK OFFICE
CERTIFICATE OF CORRECTION

PATENT NO. : 7,761,874 B2  Page 1 of 1
APPLICATION NO. : 10/917926
DATED : July 20, 2010
INVENTOR(S) : Devadatta V. Bodas It is certified that error appears in the above-identified patent and that said Letters Patent is hereby corrected as shown below:

On the face page, in field (56), under "OTHER PUBLICATIONS", in column 2, line 1, delete "scalling" and insert -- scaling --, therefor.

On Sheet 1 of 6, in Fig. 1 (Reference Numeral 22), line 1, delete "Performace" and insert -- Performance --, therefor.

On Sheet 1 of 6, in Fig. 2 (Reference Numeral 22'), line 1, delete "Performace" and insert -- Performance --, therefor.

Signed and Sealed this

Fifth Day of October, 2010

David J. Kappos
*Director of the United States Patent and Trademark Office*